United States Patent Office 2,693,475
Patented Nov. 2, 1954

2,693,475
PROCESS FOR PREPARING PRECALCIFEROL

Leon Velluz, Paris, and Gaston Amiard, Romainville, France, assignors to Usines Chimiques Des Laboratoires Francais, Paris, France, a corporation of France No Drawing. Application October 29, 1949,
Serial No. 124,504

Claims priority, application France January 21, 1949

4 Claims. (Cl. 260—397.2)

This invention relates to vitamin preparations and methods of making the same; more particularly, the invention relates to a new substance useful for the preparation of vitamin $D_2$, as well as to methods for producing such substance.

Heretofore, the formation of vitamin $D_2$ was considered a direct function of light energy. Contrary to this accepted theory, we have discovered that vitamin $D_2$ (calciferol) may be produced without light energy and with a small amount of heat energy from a novel substance, which will hereinafter be called "precalciferol."

It is an object of the present invention to provide a new chemical substance, hereinafter referred to as "precalciferol."

It is a further object of this invention to provide methods for the production of precalciferol.

It is also an object of the invention to provide an industrial process for the preparation of vitamin $D_2$ from precalciferol.

In accordance with this invention, one procedure for obtaining our new substance is to prepare in the usual manner the irradiation "resin" of ergosterol, then to esterify it, for example with dinitro-3,5-benzoyl chloride, while carefully keeping the temperature below 25° C. at all stages of the process. This step may be followed by chromatographic separation on neutral alumina. From the fraction least strongly adsorbed, an amber colored oil is separated which gradually crystallizes under ligroin. Precalciferol in the form of its dinitrobenzoate is thus isolated, with a yield of the order of 50% of the "resin."

Percentage analysis and cryoscopy show that this dinitrobenzoate of precalciferol, $C_{35}H_{46}O_6N_2$, is an isomer of the dinitrobenzoate of calciferol.

| Analysis | C, Percent | H, Percent | N, Percent | Molec. Weight |
| --- | --- | --- | --- | --- |
| Computed | 71.2 | 7.85 | 4.7 | 590 |
| Found experimentally | 70.9 | 7.8 | 4.7 | 560 |

The new substance is clearly distinguishable from the dinitrobenzoate of calciferol studied by Windaus, just as it cannot possibly be confused with any of the derivatives previously described in the photochemical formation of calciferol. The table below gives the physical constants published in literature and those determined by the applicants to permit a comparison with those of dinitrobenzoate of precalciferol.

| | Melting Point, degree | $(\alpha)_D$ Specific Rotary Power |
| --- | --- | --- |
| Ergosterol (dinitrobenzoate) | 203 | −50° ($CHCl_3$). |
| Lumisterol (dinitrobenzoate) | 140–141 | +24° ($C_6H_6$). |
| Tachysterol (amorphous) | | −70° (benzine). |
| Precalciferol (dinitrobenzoate) | 103–104 | +30° ($C_6H_6$). <br> +45° ($CHCl_3$). |
| Calciferol (dinitro-benzoate) | 158–159 | +57° ($C_6H_6$). <br> +88° $CHCl_3$). |
| Suprasterol I (dinitrobenzoate) | 154 | +32° ($CHCl_3$). |
| Suprasterol II (dinitrobenzoate) | 180–181 | −11° ($CHCl_3$). |

Dinitrobenzoate of precalciferol crystallizes in fine, very pale yellow needles, while dinitrobenzoate of calciferol forms large crystals which are bright yellow. The best solvent so far discovered for separating the two substances is methylethylketone.

Alkaline saponification of the dinitrobenzoate at 10–15° C. produces the precalciferol in an amorphous state. The specific rotary power of this substance for the D line of the spectrum is in the vicinity of +43° (benzene $c=1\%$), while it is +85° for calciferol.

Subjected to the action of acid chlorides or of acid anhydrides, precalciferol produces esters, the most interesting of which seems to be the dinitrobenzoate already described. Precalciferol is not precipitated by digitonin.

Precalciferol, obtained by saponification of its dinitrobenzoate, exhibits an evolution of its rotary power when heated in a solvent. It thus forms vitamin $D_2$ or calciferol without being subjected to light energy.

The applicants have ascertained, on the other hand, that the same substance can be obtained by another process based on the following observation: the transformation of precalciferol into calciferol exhibits a reversible character.

Consequently, if a solution of dinitrobenzoate of calciferol in benzene is heated moderately, say at 60° C. for 20 hours, the rotary power changes in the direction of a slight diminution, from +57° to +51°. Fractional crystallizations and chromatography yield dinitrobenzoate of precalciferol which, by saponification, in turn yields precalciferol.

However, since in this instance the equilibrium of the two substances is always strongly displaced in favor of calciferol, the yield of precalciferol is inferior to that of the direct process.

Various modes of preparation of precalciferol are given below by way of example but without limiting the scope of this invention as defined in the appended claims:

*Example 1.—Direct process (preparation of precalciferol beginning with the irradiation "resin" of ergosterol)*

55 grams of ergosterol dissolved in 4,000 cc. of sulfuric ether are irradiated for 2 hours in a nitrogen atmosphere at a temperature of 30° by the light of magnesium sparks. After distillation of the ether under vacuum at 10–15°, the non-transformed ergosterol (65% of the quantity employed at the start) is eliminated by treatment with methanol, in which it is only slightly soluble. After evaporation of the methanol under vacuum at 30° C., the residual oil is purified of the last traces of methanol by several treatments with benzene. The "resin" thus obtained (19 grams) is esterified in 1 hour at 15° C. in a benzene solution with chloride of dinitro-3, 5-benzoyl in the presence of pyridine. After washings of the benzene solution with a 10% solution of sodium bicarbonate, then with water, and finally with dilute hydrochloric acid, the benzene is removed under a reduced pressure at 10–15°. The crude, oily dinitrobenzoate obtained (30 grams) is dissolved in a mixture of 40 cc. of benzene and 400 cc. of petroleum ether. A slight quantity of indissoluble substance is separated by filtration, and then the solution is chromatographed on a column of 300 grams of neutral alumina. The chromatogram is developed by washing with a solution of petroleum ether containing 10% benzene until the yellow coloration reaches the bottom of the column. The lower half of the alumina column, after the top half has been separated from it, is washed with ether, which results in a yield of 13 grams of crude dinitrobenzoate of precalciferol, which crystallizes upon treatment with a little petroleum ether. After recrystallization by dissolution at 20° in three volumes of methyl ethylketone and the addition of 5 volumes of absolute alcohol, 10 grams of pure dinitrobenzoate of precalciferol, in fine, pale yellow needles is obtained. Its melting point is 103–104°.

Thus the yield is around 50% by weight of the "resin" with the ergosterol excluded and before esterification.

The precalciferol is obtained by alkaline saponification of the dinitrobenzoate, employing the usual methods, but keeping the temperature always below 15° C.

*Example II.—Indirect process (obtaining precalciferol from the dinitrobenzoate of calciferol)*

100 grams of dinitrobenzoate of calciferol are dissolved in 100 cc. of benzene and heated under slight reflux for 8 hours. The benzene is removed at reduced pressure at a temperature of less than 20° C. The residue is treated with 100 cc. of methylethylketone and kept under refrigeration overnight. The dinitrobenzoate of calciferol which has not reacted is filtered off, washed with a little methylethylketone, and dried at 50° (76.5 grams).

The methylethylketone mother liquor is removed under vacuum at a temperature below 20°. The oily residue is dissolved in 100 cc. of petroleum ether. After remaining overnight under refrigeration, 6.5 grams of dinitrobenzoate of precalciferol is extracted by centrifuging or by other methods involving drying without heating.

The solution is diluted to 200 cc. by adding petroleum ether and chromatographed on 100 grams of neutral alumina. This is washed with petroleum ether. The filtrate is concentrated under vacuum at a temperature of less than 20°. Crystallization is started, and the solution left overnight under refrigeration. Another 4.5 grams of dinitrobenzoate of precalciferol are thus collected.

In total, there has been separated: 11 grams of dinitrobenzoate of precalciferol, melting point 103–104° (bloc), $(\alpha)_D = +30°$ (benzene $c=1\%$), $+45°$ (CHCl$_3$, $c=1\%$), and 76.5 grams of dinitrobenzoate of calciferol, melting point 158° (bloc), $(\alpha)_D = +57°$ (benzene 1%), $+88°$ (CHCl$_3$, $c=1\%$).

*Example III.—Preparation of vitamin D$_2$ or calciferol beginning with precalciferol without the supply of light energy and employing only the influence of moderate heating*

A 1% solution of dinitrobenzoate of precalciferol in benzene is heated while sheltered from light, for example, at 60° for 20 hours or for 2 days at 40° C.; or for from 2 to 3 hours at 80° C. The higher the temperature, the shorter the duration of the desired transformation. In practice, it seems preferable not to exceed 80° in order to avoid excessive resinification.

At the start of the process, the specific rotary power is that of dinitrobenzoate of precalciferol in benzene, say $+30°$. Gradually, this rotary power increases and at the end of the process attains a value very close to that of pure dinitrobenzoate of calciferol, in general $+50°$. It suffices to distill off the benzene under reduced pressure, and then to recrystallize in the usual manner to separate the pure dinitrobenzoate of calciferol, melting point 158–159°, $(\alpha)_D = +57°$ (C$_6$H$_6$). By saponification of its dinitrobenzoate in the usual manner the vitamin D$_2$ is finally obtained.

In the above process, the starting material was the dinitrobenzoate of precalciferol. The preparation may equally well be made by simple heating of free precalciferol, obtained by saponification of its dinitrobenzoate. The rotary power of precalciferol in benzene solution is almost half that of calciferol: $+43°$ instead of $+85°$. In carrying out the heating process just described, the evolution of the rotary power leads, at the end of the process, to a value of the order of $+70°$. The usual concentrations and recrystallizations then accomplish the separation of calciferol. Alternatively, one may proceed to the direct esterification of the heated product, by the chloride of dinitrobenzoyl and obtain an excellent yield of pure dinitrobenzoate of calciferol from which calciferol is liberated by saponification.

In both cases, as has been shown, the new substance for producing vitamin D$_2$ which forms the object of the present invention produced vitamin D$_2$ most satisfactorily under the influence of moderate heating and in the absence of light. However, numerous variations may be employed without departing from the principle of the invention, i. e. the preparation of calciferol from precalciferol.

What is claimed is:

1. In a process of preparing precalciferol, said precalciferol being an isomer of calciferol, having a rotatory power $[\alpha]_D$ of about $+43°$ (benzene, $c=1\%$), and forming a 3,5-dinitrobenzoate having a melting point of about 103–104° C., the steps comprising esterifying, by means of 3,5-dinitro benzoyl chloride, the mixture of irradiation products obtained on irradiating ergosterol, at a temperature not exceeding 25° C. at any stage of the esterification step, separating, by chromatography, a less strongly adsorbed fraction of the esterified irradiation mixture, crystallizing said fraction by means of a solvent, and saponifying the crystallized product by means of alkalies at a temperature not exceeding about 15° C.

2. In a process of preparing precalciferol, said precalciferol being an isomer of calciferol, having a rotatory power $[\alpha]_D$ of about $+43°$ (benzene, $c=1\%$), and forming a 3,5-dinitrobenzoate having a melting point of about 103–104° C., the steps comprising esterifying the mixture of irradiation products obtained on irradiating ergosterol with 3,5-dinitro benzoyl chloride in the presence of a tertiary amine at a temperature not exceeding 25° C. at any stage of the esterification step, removing the tertiary amine by means of a dilute mineral acid, dissolving the resulting esterification product in petroleum ether containing about 10% of benzene, passing said solution through a chromatographic column of aluminum oxide, developing the chromatogram with petroleum ether containing about 10% of benzene until the yellow band reaches the bottom of said chromatographic column, separating the lower half of said column from the upper half, eluting said lower half with ether, crystallizing the resulting 3,5-dinitro benzoate of precalciferol by means of petroleum ether, recrystallizing said dinitro benzoate from a mixture of methyl ethyl ketone and alcohol, and saponifying the ester by means of alkali at a temperature not exceeding 15° C. to form precalciferol.

3. In a process of preparing an ester of precalciferol, said precalciferol being an isomer of calciferol, having a rotatory power $[\alpha]_D$ of about $+43°$ (benzene, $c=1\%$), and forming a 3,5-dinitro benzoate having a melting point of about 103–104° C., the steps comprising esterifying, by means of 3,5-dinitro benzolchloride, the mixture of irradiation products obtained o nirradiating ergosterol, at a temperature not exceeding 25° C. at any stage of the esterification step, separating, by chromatography, a less strongly adsorbed fraction of the esterified irradiation mixture, and crystallizing said fraction by means of a solvent.

4. In a process of preparing precalciferol-3,5-dinitro benzoate, having a melting point of about 103–104° C., the steps comprising esterifying the mixture of irradiation products obtained on irradiating ergosterol with 3,5-dinitro benzoyl chloride in the presence of a tertiary amine at a temperature not exceeding 25° C. at any stage of the esterification step, removing the tertiary amine by means of a dilute mineral acid, dissolving the resulting esterification product in petroleum ether containing about 10% of benzene, passing said solution through a chromatographic column of aluminum oxide, developing the chromatogram with petroleum ether containing about 10% of benzene until the yellow band reaches the bottom of said chromatographic column, separating the lower half of said column from the upper half, eluting said lower half with ether, crystallizing the resulting 3,5-dinitro benzoate of precalciferol by means of petroleum ether, and recrystallizing said dinitro benzoate from a mixture of methyl ethyl ketone and alcohol.

References Cited in the file of this patent

UNITED STATES PATENTS

| Number | Name | Date |
|---|---|---|
| 1,873,942 | Windaus | Aug. 23, 1932 |
| 1,902,745 | Windaus | Mar. 21, 1933 |
| 1,902,785 | Linsert | Mar. 21, 1933 |
| 2,030,377 | Linsert | Feb. 11, 1936 |
| 2,302,828 | Yoder | Nov. 24, 1942 |

FOREIGN PATENTS

| Number | Country | Date |
|---|---|---|
| 230,808 | Switzerland | Apr. 17, 1944 |

OTHER REFERENCES

Fieser, Natural Products Related to Phenanthrene, 3rd. ed. 1949, pp. 168–177.